(12) United States Patent
Hayashi et al.

(10) Patent No.: US 7,545,583 B2
(45) Date of Patent: Jun. 9, 2009

(54) OPTICAL LENS HAVING ANTIREFLECTIVE STRUCTURE

(75) Inventors: Katsuhiko Hayashi, Katano (JP);
Yasuhiro Tanaka, Nishinomiya (JP);
Michihiro Yamagata, Osaka (JP)

(73) Assignee: Panasonic Corporation, Osaka (JP)

( * ) Notice: Subject to any disclaimer, the term of this patent is extended or adjusted under 35 U.S.C. 154(b) by 59 days.

(21) Appl. No.: 11/386,788

(22) Filed: Mar. 23, 2006

(65) Prior Publication Data

US 2006/0215280 A1  Sep. 28, 2006

(30) Foreign Application Priority Data

Mar. 24, 2005 (JP) ............................. 2005-086349

(51) Int. Cl.
*G02B 3/02* (2006.01)

(52) U.S. Cl. ...................... 359/708; 359/719

(58) Field of Classification Search ................. 359/569, 359/708, 719
See application file for complete search history.

(56) References Cited

U.S. PATENT DOCUMENTS

| 7,145,721 | B2 * | 12/2006 | Banish et al. ............... 359/569 |
| 2007/0144700 | A1 * | 6/2007 | Kobayashi et al. ............ 164/14 |
| 2007/0159698 | A1 * | 7/2007 | Taguchi et al. .............. 359/586 |

FOREIGN PATENT DOCUMENTS

| JP | 2003-149443 | 5/2003 |
| JP | 2004-145003 | 5/2004 |

\* cited by examiner

*Primary Examiner*—William C Choi
(74) *Attorney, Agent, or Firm*—McDermott Will & Emery LLP

(57) ABSTRACT

An optical lens in which reflection is suppressed is provided by providing the optical lens with: a convex lens surface having, when the angle between a plane in contact with the lens surface and a direction perpendicular to the optical axis is an inclination angle, a maximum inclination angle of not less than 35 degrees and less than 90 degrees; and an antireflective structure provided on the lens surface and including structural elements that have a predetermined shape and are periodically arranged in an array form with a pitch smaller than the shortest wavelength of the incident light.

17 Claims, 5 Drawing Sheets

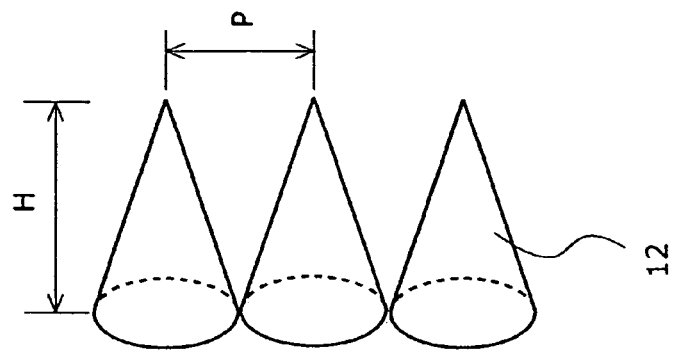
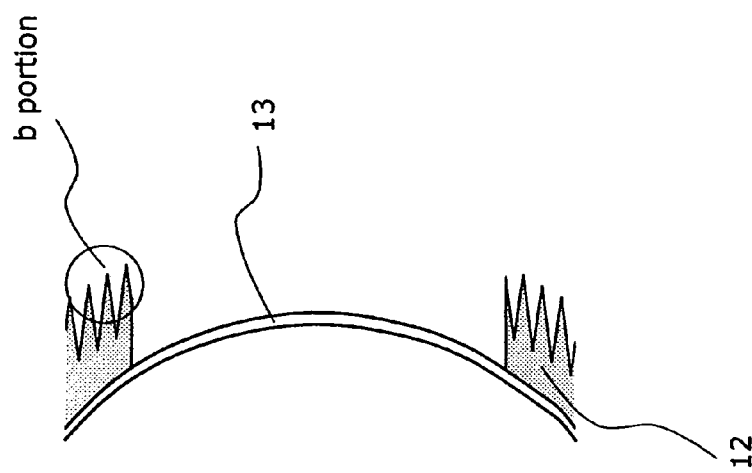
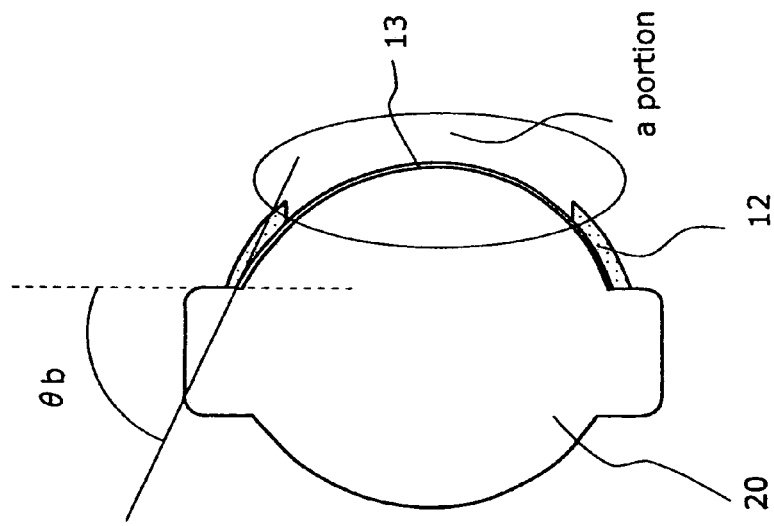

OPTICAL LENS HAVING ANTIREFLECTIVE STRUCTURE

BACKGROUND OF THE INVENTION

1. Field of the Invention

The present invention relates to an optical lens having an antireflective structure, and more specifically, to an optical lens having an antireflective structure on a lens surface.

2. Description of the Background Art

Transmissive optical elements are used for various optical systems such as those for cameras, projectors, and optical pickup devices. To obtain a predetermined optical performance, these optical systems require optical elements that efficiently transmit light. On the other hand, a technology is known of applying an antireflective coating along the surface of optical elements.

Research has been pursued on high-density and large-capacity optical disks such as DVDs (digital versatile disks) and Blue-ray disks(R). To play back information recorded on an optical disk, a laser beam is condensed on the optical disk by an objective lens, and the reflected light caused by the condensation is applied to an optical detector. To record information, a laser beam is condensed on the optical disk by the objective lens. To densely play back or record information, it is necessary that the beam spot formed on the optical disk by the objective lens be small. The beam spot is directly proportional to the wavelength of the laser beam used, and is inversely proportional to the NA (numerical aperture) of the objective lens. Therefore, a high-NA objective lens capable of reducing the beam spot is desired. For example, for DVDs, an optical lens having an NA of 0.6 is used for a wavelength of 635 nanometers, and for Blue-ray disks(R), an optical lens having an NA of 0.85 is used for a laser beam having a wavelength near 400 nanometers.

However, in the optical pickup devices, the laser beam intensity has a Gaussian intensity distribution such that the intensity is largest around the optical axis of the optical lens and gradually decreases toward the rim. In the high-NA optical lenses, since a laser beam with a short wavelength is condensed on the optical disk as mentioned above, it is necessary that the curvature of each lens surface be high. For this reason, the transmittance of the laser beam in a lens peripheral area where the incident angle is large is low. As described above, in the high-NA optical lenses, reduction in light quantity is large because of the characteristic of the light intensity distribution of the lens and the laser beam.

However, according to the method of applying an antireflective coating, since the curvature in the peripheral area of the high-NA lenses is high, the thickness of the antireflective coating applied to the peripheral area of the lens is small compared with that around the optical axis. For this reason, the laser beam transmittance in the lens peripheral area is low and it is therefore difficult to reduce the beam spot diameter.

On the contrary, Japanese Laid-Open Patent Publication No. 2004-145003 (hereinafter, referred to as Patent Document 1) proposes a technology associated with a method of excellently applying an antireflective coating to the high-NA optical lenses. Patent Document 1 proposes an optimum coating thickness design condition based on the angle of the incident light.

However, the antireflective coating method described in Patent Document 1 can be realized by controlling the minute coating thickness. For this reason, it is difficult to provide a high-NA optical lens to which an appropriate coating is actually applied according to the design condition. In addition, the applied antireflective coating has a large thickness error from the design thickness, so that it is extremely difficult to obtain an optical lens having excellent transmittance.

In the optical pickup devices, to obtain excellent recoding/playback signals, it is desirable for the optical lens to have a uniform light quantity distribution from the axial to peripheral areas. However, the thickness error from the design thickness increases as the curvature of the lens surface increases. For this reason, in the high-NA optical lenses, the thickness error in the lens peripheral area is large, so that it is difficult for the light quantity distribution to be uniform. Consequently, the overall transmittance of the optical lens is low, so that it is difficult to form an excellent beam spot on the optical disk. As described above, it is difficult to provide a high-NA optical lens provided with excellent transmittance by the application of an antireflective coating.

SUMMARY OF THE INVENTION

Therefore, the present invention is made to solve the problem, and an object thereof is to provide an optical lens in which the light reflection at the interface is suppressed.

An object of the present invention is attained by an optical lens, the optical lens being provided with:

a convex lens surface having, when an angle between a plane in contact with the lens surface and a direction perpendicular to an optical axis is an inclination angle, a maximum inclination angle of not less than 35 degrees and less than 90 degrees; and an antireflective structure provided on the lens surface and including structural elements that have a predetermined shape and are arranged in an array form with a pitch smaller than a shortest wavelength of incident light.

According to the present invention, an optical lens in which the light reflection at the interface can be suppressed can be provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4A is a schematic structural view of an optical lens according to a second embodiment;

FIG. 4B is a schematic enlarged view of the a portion of the optical lens according to the second embodiment;

FIG. 4C is a schematic enlarged view of the b portion of the optical lens according to the second embodiment.

DESCRIPTION OF THE PREFERRED EMBODIMENTS

First Embodiment

Figure 1:
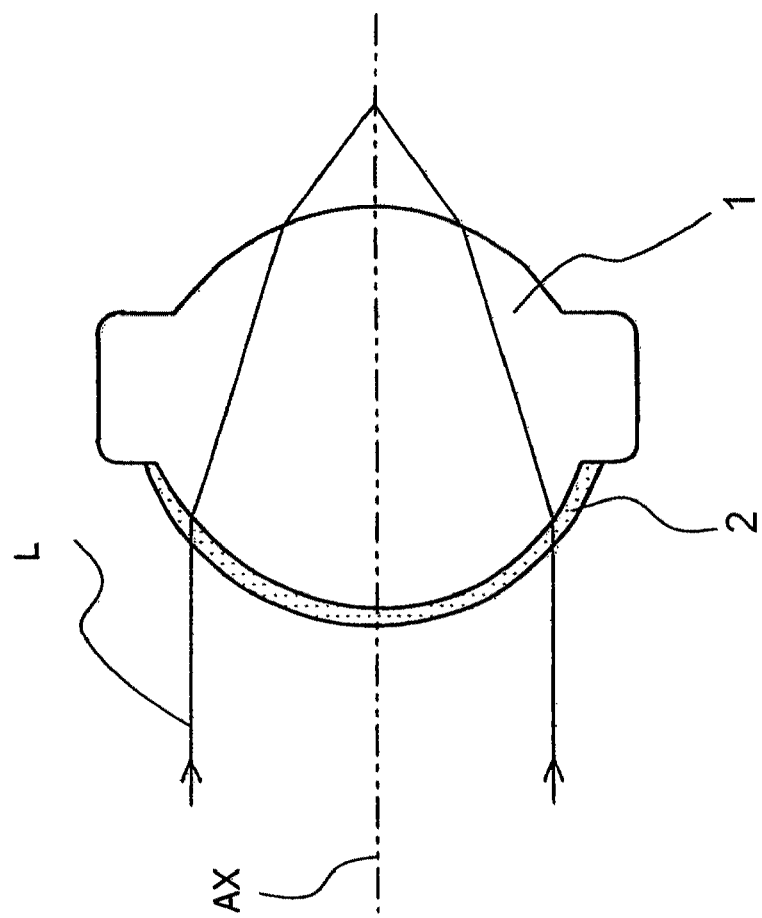
FIG. 1 is a light beam view of an optical lens according to a first embodiment.
Figure 2C:
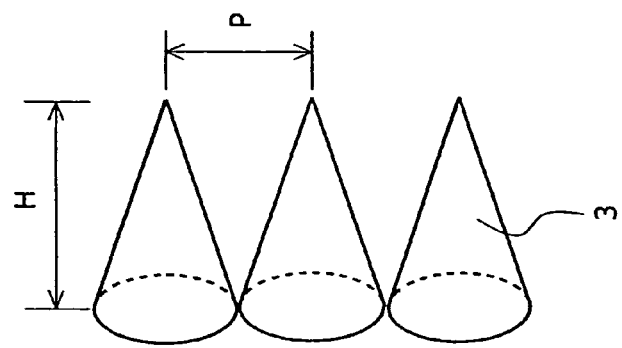
FIG. 2C is a schematic enlarged view of a b portion of the optical lens according to the first embodiment.
Figure 2B:
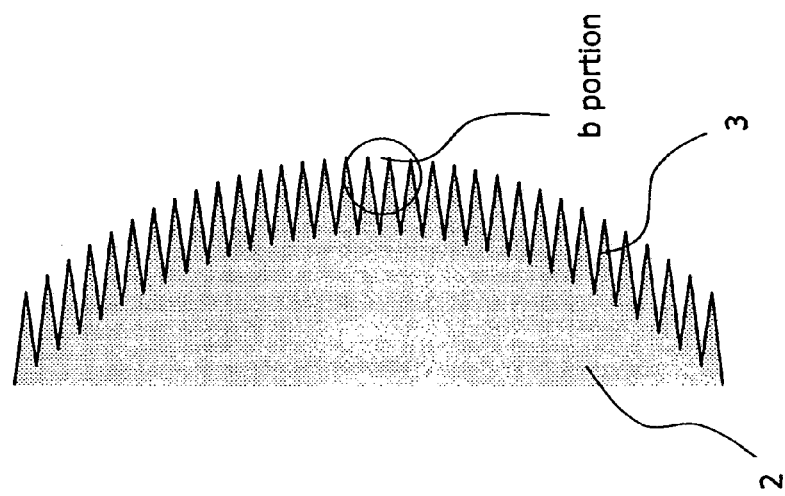
FIG. 2B is a schematic enlarged view of an a portion of the optical lens according to the first embodiment.
Figure 2A:
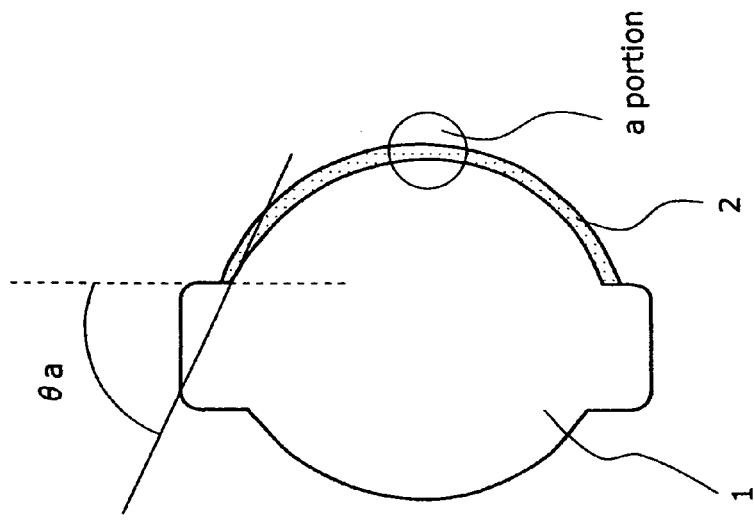
FIG. 2A is a schematic structural view of the optical lens according to the first embodiment.

FIGS. 1 and 2A to 2C are views of an optical lens according to a first embodiment of the present invention. FIG. 1 is a light beam view of the optical lens 1. FIG. 2A is a schematic structural view. FIG. 2B is a schematic enlarged view of an a portion. FIG. 2C is a schematic enlarged view of a b portion. In the present embodiment, the wavelength of the laser beam used is near 400 nanometers, and the optical lens 1 has an NA of 0.85.

In FIG. 1, a laser beam L emitted from a non-illustrated laser source is incident on the optical lens 1. An antireflective structure 2 that prevents the reflection of the incident light is formed on the lens surface where the light beam L is incident. The light beam L passes through the antireflective coating 2 and the optical lens 1, and then, condenses in a predetermined position.

Macroscopically, the optical lens 1 is a convex lens the surfaces of which are curved. To realize a high NA, the optical lens 1 has a configuration that increases the curvature of the lens surface in the lens peripheral area. Here, when the angle between a plane in contact with the lens surface and a direction perpendicular to the optical axis is the inclination angle, the maximum inclination angle θa of the optical lens 1 is 60 degrees.

As shown in FIGS. 2A to 2C, the optical lens 1 has the minute antireflective structure 2 on the curved surface where light is incident. In the antireflective structure, structural elements having a predetermined shape are arranged in an array form with a pitch smaller than the lower limit of the wavelength of the incident light, that is, with a pitch smaller than the shortest wavelength of the incident light. By thus periodically arranging structural elements having a predetermined shape in an array form, an antireflective surface can be formed where for the incident light, the apparent refractive index is continuously changed and the incident angle dependence and wavelength dependence of the transmission/reflection characteristic at the interface with the air layer are small.

The antireflective structure formed on the optical lens 1 means a member having a minute structure formed on its surface to prevent the reflection of the light the reflection of which is to be reduced, and includes not only a mode that completely prevents the reflection of the light the reflection of which is to be reduced but also a mode that has the effect of preventing the reflection of the light the reflection of a predetermined wavelength of which is to be reduced. An example of the antireflective structure usable for the present embodiment is a structure as shown in the schematic enlarged views of FIGS. 2A to 2C and 3A to 3C where the structural elements are conical protrusions with a height H and these conical protrusions are arranged in an array form with a pitch P.

The pitch means a pitch in the most dense arrangement direction when a multiplicity of minute structural elements are two-dimensionally arranged in the antireflective structure.

While the pitch P between the structural elements is substantially fixed in one arrangement direction in the antireflective structure and it is necessary for the pitch P only to be smaller than the shortest wavelength of the incident light, from the viewpoint of further reducing the incident angle dependence and wavelength dependence of the transmission/reflection characteristic at the interface, it is desirable that the pitch P be not more than half, further, not more than one-third the shortest wavelength of the incident light. For the laser beam, having a wavelength near 400 nanometers, used in the present embodiment, the pitch is 0.15 micrometer.

The heights H of the structural elements are not specifically limited. In the antireflective structure, it is not always necessary that the heights H of all the structural units be the same, and the larger the heights H are, the higher the antireflective effect on the incident light is. Therefore, it is desirable that the heights H be at least not less than the pitch P (the height of the shortest structural elements be not less than the pitch), further, at least not less than three times the pitch P (the height of the shortest structural elements be not less than three times the pitch). In the present embodiment, the incident light is a laser beam of a wavelength near 400 nanometers, and the heights are 0.15 micrometer. Considering, for example, the manufacturability of the antireflective structure as described later, it is desirable that the heights H be not more than a certain height; normally, it is desirable that the heights be not more than approximately four times the pitch P (the height of the largest structural elements be not more than approximately five times the pitch).

It is desirable that the lens and the antireflective structure be molded integrally with each other. The optical lens 1 according to the present embodiment can be manufactured, for example, by injection-molding a resin by use of a high-precision master mold precisely machined to the same configuration as that of the antireflective structure 2 or a mold machined by a semiconductor process. Thereby, the optical lens 1 having the antireflective structure can be inexpensively mass-manufactured.

Figure 3C:
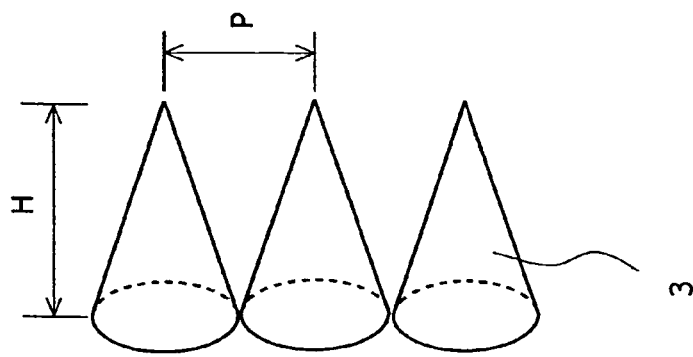
FIG. 3C is a schematic enlarged view of the b portion of the optical lens, having the antireflective structure in the peripheral area, according to the first embodiment.
Figure 3B:
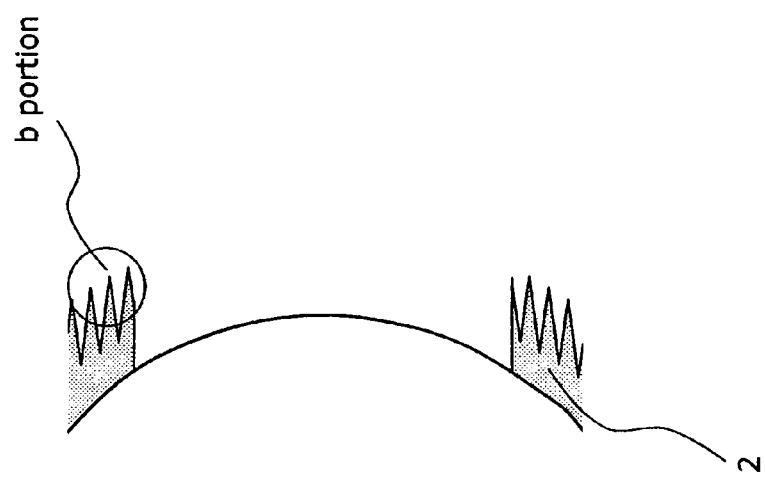
FIG. 3B is a schematic enlarged view of the a portion of the optical lens, having the antireflective structure in the peripheral area, according to the first embodiment.
Figure 3A:
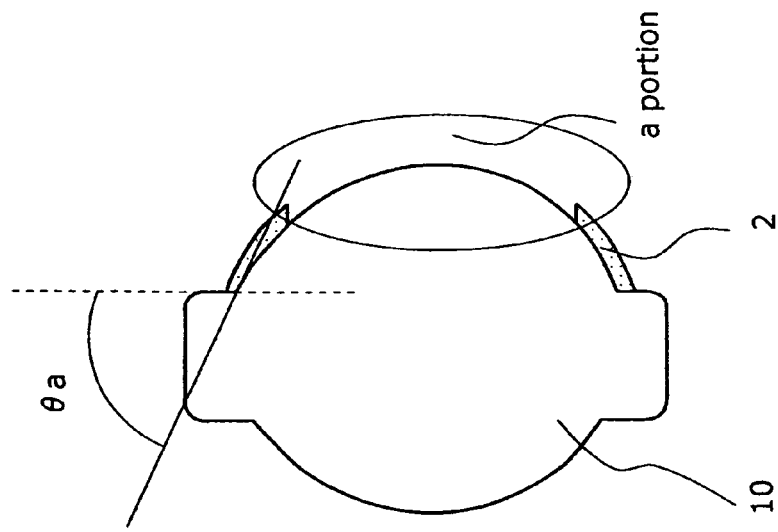
FIG. 3A is a schematic structural view of the optical lens, having an antireflective structure on a peripheral area, according to the first embodiment.

On the other hand, the optical lens 10 shown in FIGS. 3A to 3C has substantially the same structure as the optical lens 1; however, it is different in that the antireflective structure 2 is provided only in a lens peripheral area. Here, the lens peripheral area is an area where when the height of incidence of the lens surface is h and the maximum effective diameter of the lens is hmax, h/hmax is not less than 0.6. Particularly, it is desirable that the antireflective structure 2 be provided in a lens peripheral area in which h/hmax is not less than 0.7 where the reduction in light quantity is large. The optical lens 10 is capable of improving the transmitted light quantity in a lens peripheral area where the maximum inclination angle is large. The optical lens 10 and the antireflective structure 2 can be molded integrally with each other, and can be inexpensively mass-manufactured.

As described above, in the optical lens according to the present embodiment, by providing the minute antireflective structure formed with a pitch smaller than the wavelength of the incident light on the lens surface, the light reflection at the interface can be suppressed and the transmittance can be improved. Consequently, the reflectance can be suppressed to be low even in the high-NA optical lenses with a large inclination angle.

Moreover, in the optical lens according to the present embodiment, since the antireflective structure is provided in the lens peripheral area, the transmittance of the laser beam in the lens peripheral area can be improved, so that an optical lens can be provided in which the reflection of the light is suppressed over the entire optical lens. Particularly, the optical lens having the antireflective structure in the lens peripheral area can be used as an objective lens for optical pickups because the ratio between the central intensity and the rim intensity is low compared with that of the light intensity distribution of the optical lens having the antireflective structure over the entire surface.

Moreover, since the optical lens according to the present embodiment can be formed integrally with the antireflective structure by use of a mold, an optical lens with a low reflectance can be easily manufactured.

While the material of the optical lens is a resin in the present embodiment, the present invention is not limited thereto. For example, it should be glass.

In the optical lens according to the present embodiment, the conventional antireflective coating should be applied to a lens surface, near the optical axis, not having the antireflective structure.

Second Embodiment

FIGS. 4A to 4C are views showing an optical lens according to a second embodiment. FIG. 4A is a schematic cross-sectional view. FIG. 4B is an enlarged view of the a portion. FIG. 4C is an enlarged view of the b portion. While the optical lens 20 according to the present embodiment has a substantially similar structure to the optical lens according to the first embodiment, it is different in the following points: The antireflective structure is formed as a sheet 12 independent of the optical lens 20, and the sheet 12 is pasted to a lens peripheral area where the curvature of the lens surface is high. Here, the lens peripheral area is an area where when the height of incidence of the lens surface is h and the maximum effective diameter of the lens is hmax, h/hmax is not less than 0.6. Particularly, it is desirable that the antireflective structure be provided in an area where h/hmax is not less than 0.7 where the reduction in light quantity is large.

The optical lens 20 has an antireflective coating 13 over the entire lens surface, and has the sheet 12 in the lens peripheral area where the maximum inclination angle is large. The antireflective coating 13 is applied onto the lens surface by a known vacuum deposition method or the like. The sheet 12 is made of a transparent material such as acryl, and the antireflective structure is formed on one surface thereof. The thickness of the sheet 12 is 10 micrometers where handling is easy and a sufficient mechanical strength is obtained. Like the first embodiment, the wavelength of the laser beam incident on the optical lens 20 is near 400 nanometers, and the structural elements of the antireflective structure are cones with a height of 0.15 micrometer, and arranged with a pitch of 0.15 micrometer.

The sheet 12 is pasted in an annular form to the lens surface. By the sheet 12 being annular, in the optical lens 20, the antireflective effect by the antireflective structure is obtained only in the lens peripheral area. In this case, the optical lens 20 and the sheet 12 are pasted together by an acrylic, an epoxy or a urethane resin. They can also be excellently pasted together by heat or a photo-curing resin.

The difference in refractive index between the sheet 12 and the optical lens 20 which is the base material is not more than 0.2. In the present embodiment, the lens base material is a glass material the refractive index n of which is 1.7, whereas the sheet is made of a resin material the refractive index n of which is 1.5. By the difference in refractive index thus being not more than 0.2, the reflection that occurs at the interface between the sheet 12 and the optical lens 20 can be suppressed to a degree that causes no problem. Further, it is desirable that the difference in refractive index between the sheet 12 and the optical lens 20 which is the base material be not more than 0.1. By the difference in refractive index thus being not more than 0.1, the reflection that occurs at the interface between the sheet 12 and the optical lens 20 which is the base material can be further reduced, so that the occurrence of backlight can be effectively suppressed.

The sheet 12 having the antireflective structure can be manufactured, for example, by the following method: First, glass softened by heating is press-molded by use of a master mold precisely machined to the same configuration as that of the antireflective structure, thereby forming a mold, made of glass, for molding the antireflective structure. Then, an acrylic material having a thickness of 10 micrometers where handing is easy and a sufficient mechanical intensity is obtained is press-molded by use of the mold, whereby the sheet 12 having the antireflective structure can be manufactured. The thickness of the sheet 12 is the sum of the height of 0.15 nanometers of the antireflective structure for the wavelength of near 400 nanometers of the laser beam used, and the thickness of 10 micrometers of the acrylic material.

As described above, since the optical lens 20 has the sheet having the antireflective structure in the lens peripheral area, the transmittance in the lens peripheral area can be improved so that a high-NA optical lens with excellent transmittance can be provided.

Particularly, for the objective lens used for optical pickup devices, it is necessary to improve the overall transmittance and make uniform the transmittance distribution from the center to the rim of the lens. However, according to the conventional antireflective coating method, there are cases where the transmittance in the peripheral area is low compared with the transmittance near the center because of a shift of the coating thickness distribution. In those cases, as mentioned above, the effect of the transmittance improvement by the antireflective structure can be provided only in the lens peripheral area, so that the light use efficiency can be improved.

Moreover, by adjusting the composition, thickness and the like of the antireflective coating applied near the optical axis, the overall transmittance of the optical lens can be adjusted, and consequently, the intensity distribution of the light transmitted by the optical lens can be adjusted.

While in the present embodiment, the sheet having the antireflective structure is pasted in an annular form, the present invention is not limited thereto. It can be pasted over the entire lens surface.

While in the present embodiment, the antireflective coating is applied to the lens surface and the sheet on which the antireflective structure is formed is pasted onto the surface of the antireflective coating, the present invention is not limited thereto. The sheet can be directly pasted onto the lens surface.

While in the first and the second embodiments, the structure including conical structural elements is used as the antireflective structure, the structure is not necessarily limited to ones having such a structure. For example, it can be a structure whose structural elements are pyramids such as regular hexagonal pyramids or quadrangular pyramids. The shape of the structural elements is not limited to a pyramid or a cone. It can be a cylinder, a prism, a bell shape whose tip is rounded, a frustum of a cone, or a frustums of pyramid. Moreover, the structural units do not necessarily have a strictly geometrical shape. It is necessary for the shape only to be substantially a cone, a pyramid, a cylinder, a prism, a bell shape, a frustum of a cone, or a frustum of a pyramid. Moreover, it is necessary for the antireflective structure only to be formed with a pitch smaller than the wavelength of the incident light.

While in the first and the second embodiments, the incident light is visible light having a wavelength of 400 nanometers, the present invention is not limited thereto. For example, as the incident light, ultraviolet light (ultraviolet band wavelength: 150 to 400 nanometers), near-infrared light (near-infrared band wavelength: 700 nanometers to 2 micrometers), or far-infrared light (far-infrared band wavelength: 2 to 13 micrometers) can be used as well as visible light. In this case, the antireflective structural elements are also formed with a pitch smaller than the wavelength. At this time, by the heights of the structural units being at least not less than the pitch, further, at least not less than three times the pitch, similar effects can be obtained. Furthermore, the antireflective structure is protrusion, the present invention is not limited thereto. Similar effects can be obtained when the antireflective structure being recess.

Figure 5:
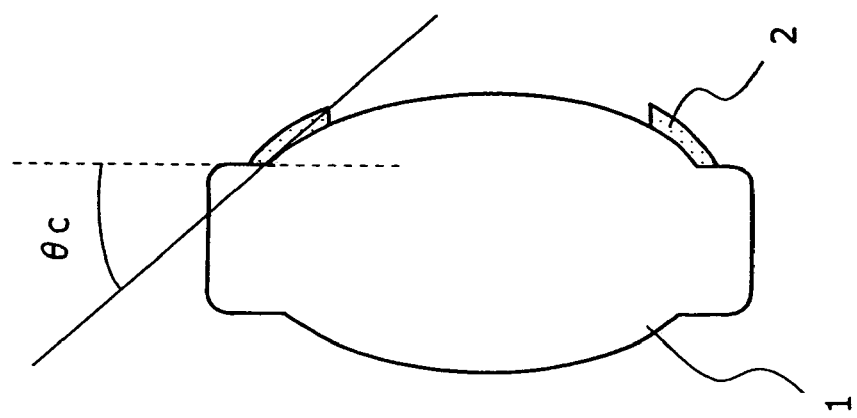
FIG. 5 is a view showing an optical lens having a curved surface whose maximum inclination angle is 40 degrees.

While in the first and the second embodiments, the antireflective structure is formed on the high-NA optical lens with an NA of 0.85, the present invention is not limited thereto. Similar effects can be obtained when an optical lens with an NA of not more than 0.85 is used. For example, similar effects can be obtained when a lens having a curved surface whose maximum inclination angle θc is 40 degrees as shown in FIG. 5 is used. Particularly, effects are produced for an optical lens having a curved surface whose maximum inclination angle is not less than 35 degrees where an error from the design coating thickness occurs when the conventional antireflective coating is applied to the lens surface. Moreover, the antireflective structure and the sheet including the antireflective structure are applicable to optical lenses whose maximum inclination angle is less than 90 degrees. Desirably, an optical lens whose maximum inclination angle is not more than 75 degrees is used.

While in the optical lens according to the first and the second embodiments, the lens peripheral area in which the antireflective structure is formed is an area where h/hmax is not less than 0.6, it is particularly desirable that the antireflective structure be provided in a lens peripheral area in which h/hmax is not less than 0.7. Thereby, the transmittance in the lens peripheral area where the reduction in light quantity is large can be improved.

While in the optical lens according to the first and the second embodiments, the incident light is incident on the lens surface where the antireflective structure is formed, the present invention is not limited thereto. It can be incident on a lens surface where the antireflective structure is not formed.

The optical lens according to the first and the second embodiments are applicable not only to optical pickup devices but also to various optical systems such as laser optical systems for optical communications, cameras, projectors, and scanning optical systems.

While the invention has been described in detail, the foregoing description is in all aspects illustrative and not restrictive. It is understood that numerous other modifications and variations can be devised without departing from the scope of the invention.

What is claimed is:

1. An optical lens comprising:
   a convex lens surface having, when an angle between a plane in contact with the lens surface in a lens peripheral area and a direction perpendicular to an optical axis is an inclination angle, a maximum inclination angle of not less than 35 degrees and less than 90 degrees; and
   an antireflective structure provided on the lens surface and including structural elements that have a predetermined shape and are arranged in an array form with a pitch smaller than a shortest wavelength of incident light,
   wherein the antireflective structure is provided in a peripheral area of the lens surface where h/hmax ≧0.6, h being a distance between the optical axis and a position where the incident light enters the lens surface and hmax being a maximum effective diameter of the lens.

2. The optical lens according to claim 1, wherein at least one layer of antireflective coating is applied to an area near the optical axis except the peripheral area.

3. The optical lens according to claim 1, wherein the optical lens is formed integrally with the antireflective structure.

4. The optical lens according to claim 1, wherein the structural elements of the antireflective structure are periodically arranged in an array form with a pitch not more than half the shortest wavelength of the incident light.

5. The optical lens according to claim 1, wherein the structural elements of the antireflective structure have a height at least not less than the pitch.

6. The optical lens according to claim 1, wherein the structural elements of the antireflective structure have a height not less than three times the pitch.

7. The optical lens according to claim 1, wherein the shape of the structural elements of the antireflective structure is any one of a substantially bell-shaped protrusion and a substantially bell-shaped depression or both.

8. The optical lens according to claim 1, wherein the shape of the structural elements of the antireflective structure is any one of a protrusion and a depression or both, the protrusion and the depression having a shape selected from among a substantially circular shape, a substantially rectangular shape, and a substantially regular hexagonal shape.

9. An optical lens comprising:
   a convex lens surface having, when an angle between a plane in contact with the lens surface in a lens peripheral area and a direction perpendicular to an optical axis is an inclination angle, a maximum inclination angle of not less than 35 degrees and less than 90 degrees; and
   a sheet including an antireflective structure provided on the lens surface and including structural elements that have a predetermined shape and are periodically arranged in an array form with a pitch smaller than a shortest wavelength of incident light,
   wherein the sheet including the antireflective structure is provided in a peripheral area of the lens surface where h/hmax ≧0.6, h being a distance between the optical axis and a position where the incident light enters the lens surface and hmax being a maximum effective diameter of the lens.

10. The optical lens according to claim 9, wherein at least one layer of antireflective coating is applied to an area near the optical axis except the peripheral area.

11. The optical lens according to claim 9, wherein the structural elements of the antireflective structure are periodically arranged in an array form with a pitch not more than half the shortest wavelength of the incident light.

12. The optical lens according to claim 9, wherein the structural elements of the antireflective structure have a height at least not less than the pitch.

13. The optical lens according to claim 9, wherein the structural elements of the antireflective structure have a height not less than three times the pitch.

14. The optical lens according to claim 9, wherein the shape of the structural elements of the antireflective structure is any one of a substantially bell-shaped protrusion and a substantially bell-shaped depression or both.

15. The optical lens according to claim 9, wherein the shape of the structural elements of the antireflective structure is any one of a protrusion and a depression or both, the protrusion and the depression having a shape selected from among a substantially circular shape, a substantially rectangular shape, and a substantially regular hexagonal shape.

16. The optical lens according to claim 9, wherein a difference in the refractive index to the incident light having the shortest wavelength between the optical lens and the sheet is not more than 0.2.

17. An optical lens comprising:
a convex lens surface having, when an angle between a plane in contact with the lens surface in a lens peripheral area and a direction perpendicular to an optical axis is an inclination angle, a maximum inclination angle of not less than 35 degrees and less than 90 degrees; and
a resin layer including an antireflective structure provided on the lens surface and including structural elements that have a predetermined shape and are periodically arranged in an array form with a pitch smaller than a shortest wavelength of incident light,
wherein the resin layer including the antireflective structure is provided in a peripheral area of the lens surface where $h/hmax \geq 0.6$, h being a distance between the optical axis and a position where the incident light enters the lens surface and hmax being a maximum effective diameter of the lens.

\* \* \* \* \*